(12) United States Patent
Moe et al.

(10) Patent No.: US 7,296,591 B2
(45) Date of Patent: Nov. 20, 2007

(54) VALVE ARRANGEMENT FOR RECIPROCATING MACHINERY SUCH AS A PUMP AND AN COMPRESSOR

(75) Inventors: Magne Moe, Harstad (NO); Åge Kyllingstad, Ålgård (NO)

(73) Assignee: National Oilwell Norway A/S (NO)

( * ) Notice: Subject to any disclaimer, the term of this patent is extended or adjusted under 35 U.S.C. 154(b) by 281 days.

(21) Appl. No.: 10/508,492

(22) PCT Filed: Mar. 18, 2003

(86) PCT No.: PCT/NO03/00092

§ 371 (c)(1),
(2), (4) Date: Apr. 8, 2005

(87) PCT Pub. No.: WO03/081047

PCT Pub. Date: Oct. 2, 2003

(65) Prior Publication Data

US 2005/0229975 A1    Oct. 20, 2005

(30) Foreign Application Priority Data

Mar. 21, 2002 (NO) .................................. 20021434

(51) Int. Cl.
*F16K 11/07* (2006.01)
(52) U.S. Cl. ..................... 137/454.4; 137/512; 417/568
(58) Field of Classification Search ............. 137/454.4, 137/512; 417/568
See application file for complete search history.

(56) References Cited

U.S. PATENT DOCUMENTS

| | | | | |
|---|---|---|---|---|
| 181,168 A | * | 8/1876 | Hill et al. ................. | 137/454.4 |
| 1,642,724 A | * | 9/1927 | Fleming ................... | 137/454.4 |
| 1,960,963 A | * | 5/1934 | Wheeler et al. .......... | 137/454.2 |
| 1,985,140 A | * | 12/1934 | Blom ....................... | 137/454.4 |
| 2,845,085 A | * | 7/1958 | Robbins ................... | 137/454.6 |
| 3,216,365 A | * | 11/1965 | Dettinger et al. ........... | 417/568 |
| 3,415,271 A | | 12/1968 | Maasberg et al. | |
| 3,726,612 A | * | 4/1973 | Greene, Jr. ................. | 417/568 |
| 4,134,381 A | | 1/1979 | Little | |
| 4,477,236 A | * | 10/1984 | Elliott ........................ | 417/568 |

* cited by examiner

*Primary Examiner*—Stephen M. Hepperle
(74) *Attorney, Agent, or Firm*—Andrus, Sceales, Starke & Sawall, LLP (57) ABSTRACT

A valve arrangement for reciprocating machine, where the arrangement (1) comprises an in-valve (18) and an out-valve (19), each valve (18), (19) being a springloaded one-way valve designed to open for flow when the pressure differential in the direction of flow provides a force that exceeds the spring tension, wherein the valves (18, 19) are mounted in a casing (8) that forms or is connected to the cylinder head of the reciprocating engine (2). The in-valve (18) and the out-valve (19) are mounted in a sleeve (16) designed to be fitted in a bore (9) in the casing (8), and where fluid may flow to the sleeve (16) from an inlet (11) in the casing (8) and into the sleeve (16) via the in-valve (18), and where the sleeve (16) is provided with at least one perforated area where fluid may flow radially out of or into the sleeve (16) via holes (50, 51), thereby flowing to or from a passage (14, 15) that forms a perpendicular or near perpendicular connection with the bore (9).

2 Claims, 7 Drawing Sheets

VALVE ARRANGEMENT FOR RECIPROCATING MACHINERY SUCH AS A PUMP AND AN COMPRESSOR

CROSS REFERENCE TO RELATED APPLICATION

The present application is the U.S. national stage application of International Application PCT/NO03/00092, filed Mar. 18, 2003, which international application was published on Oct. 2, 2003 as International Publication WO 03/081047. The International Application claims priority of Norwegian Patent Application 20021434, filed Mar. 21, 2002.

BACKGROUND OF THE INVENTION

The invention regards a valve arrangement for reciprocating machinery such as a pump and a compressor.

Reciprocating machinery, or a reciprocating engine, typically has an induction valve and an exhaust valve, hereinafter termed in-valve and out-valve, for each piston. Normally, springloaded one-way valves are used, where a spring closes the valve by forcing a valve body against a valve seat. A valve may be opened for flow either through mechanical action or by pressure in the working medium of the reciprocating engine, hereinafter termed fluid, acting on the valve body to generate a force directed opposite to the force from said spring.

If valves of the type in question are arranged so that the direction of flow through the valves is parallel with the cylinder axis of the reciprocating engine, the valves and attached pipework project a relatively long way from the cylinder head of the reciprocating engine. Therefore it is desirable to mount the valves in a manner such that fluid may flow across the cylinder axis immediately outside the cylinder head. If fluid is to flow to and from the cylinder in parallel with the cylinder axis, the direction of fluid flow must change in connection with the valve arrangement. Such a change in direction results in lateral flow forces that act on the valve body and cause misalignment of this. The result is skewed or uneven wear on the valve body and the valve seat, which causes leakage in a closed valve. In the event of such leakage the valve in question must be replaced, or the valve must be disassembled and the worn parts replaced. Changing valves or worn valve components may be time consuming, particularly in the case of large reciprocating machinery such as a reciprocating pump for drill fluid for use in drilling of petroleum wells.

SUMMARY OF THE INVENTION

It is an object of the invention to provide a valve arrangement for reciprocating machinery, where the flow forces cause little or no misalignment of the valve body. It is a further object to simplify the work involved in changing valves.

The objects are achieved by the characteristics given in the following description and in the appended claims.

According to the invention, two springloaded one-way valves that are known per se, one in-valve and one out-valve, are mounted in a spaced-apart manner in a tubular sleeve, so that the axial direction of flow is the same for both valves. The in-valve is arranged in the sleeve at the first end of this, which forms the inlet end of the sleeve. The out-valve is arranged in the sleeve at the second end of this, the outlet end.

The valves divide the sleeve into three chambers; an inlet chamber between the first end of the sleeve and the valve seat of the in-valve, a working chamber between the valve seat of the in-valve and the valve seat of the out-valve, and an outlet chamber between the valve seat of the out-valve and the second end of the sleeve.

At the working chamber the sleeve wall is equipped with a first perforated area having through openings for the fluid to flow radially into or out of the sleeve. At the outlet chamber the sleeve wall is equipped with a second perforated area, so as to allow fluid to flow radially out of the sleeves as well.

The sleeve with the valves is designed to be installed in a bore in the cylinder head of a reciprocating engine or in a casing that is connected to or forms part of a cylinder head. An external annular gasket at either end of the sleeve and a similar intermediate gasket define two annuli between the sleeve and the bore, the diameter of the bore being enlarged between sealing surfaces against which said gaskets provide a seal. Thus a working annulus is defined between a gasket at the first end of the sleeve and said intermediate gasket. Similarly, an outlet annulus is defined between a gasket at the second end of the sleeve and the intermediate gasket. Advantageously the sleeve has a smaller outside diameter between the gaskets, as this will facilitate the mounting and dismounting of the sleeve. It will also help increase the cross sectional area of the annuli.

A first passage in the casing (or the cylinder head) constitutes an inlet for fluid and leads to the first end of the bore, i.e. to the inlet end of the sleeve when the sleeve is installed in the bore. Advantageously the passage is axial with respect to the sleeve and the bore. A second passage in the casing constitutes a working passage and connects said first annulus, the working annulus, with the cylinder of the reciprocating engine. The working passage is typically perpendicular or near perpendicular to the longitudinal axis of the bore. A third passage in the casing forms the outlet for fluid from the second annulus, the outlet annulus. The outlet is typically perpendicular or near perpendicular to the longitudinal axis of the bore. Thus the working passage and the outlet are radially oriented with respect to the bore, and the working passage and the outlet may have different radial orientations.

The working annulus is positioned eccentrically with respect to the axis of the bore. The distance between the sleeve and the periphery of the working annulus is at its greatest where the working passage ends, and at its smallest at the diametrically opposite side of the working passage.

The outlet annulus exhibits corresponding eccentricity with respect to the axis of the bore. The distance between the sleeve and the periphery of the outlet annulus is at its greatest where the outlet joins the working, and at its smallest at the diametrically opposite side of the outlet.

The sleeve is installed in the bore through being inserted into the bore through the second end of this, until it abuts a step in the bore or the bottom of the bore at the first end of the bore, whereupon the second end of the bore is sealed with a cover. The cover may be executed with an abutment that projects into the bore and presses against the second end of the sleeve, keeping the sleeve fixed in the bore.

Fluid flows radially between the working chamber of the sleeve and the working annulus outside. The fluid flow is uniformly distributed, so that no lateral forces occur which may misalign the valve body of the in-valve. Similarly, fluid flows out of the outlet chamber to the outlet annulus in a radial and uniformly distributed manner.

By the arrangement described, the valves of a reciprocating engine can easily be replaced by dismantling the cover, pulling out the sleeve with the valves, installing a new sleeve with valves and finally fitting the cover. It is also easy to test valves for set pressure and sealing effect in a test installation outside the reciprocating engine, as the sleeve may be arranged in a bore in a casing in which the inlet and the working passage are connected to a pressure source.

When a valve arrangement in accordance with the invention is used in a reciprocating engine in which a piston cyclically executes an induction stroke followed by a power stroke, fluid will, upon the induction stroke, flow via the casing inlet to the first end of the sleeve, into the sleeve via the in-valve and radially out of the casing to the working passage and on to the cylinder of the reciprocating engine. On the subsequent power stroke fluid flows from the cylinder via the working passage to the working annulus, and then radially through the first perforated area of the sleeve and into the sleeve, whereupon the fluid then continues axially through the out-valve and then radially out of the sleeve via the openings in the second perforated area to the outlet annulus, and from there to the outlet.

BRIEF DESCRIPTION OF THE DRAWINGS

The invention is described in greater detail by means of an example of an embodiment, and reference is made to the attached drawings, in which.

DETAILED DESCRIPTION OF THE INVENTION

Figure 1:
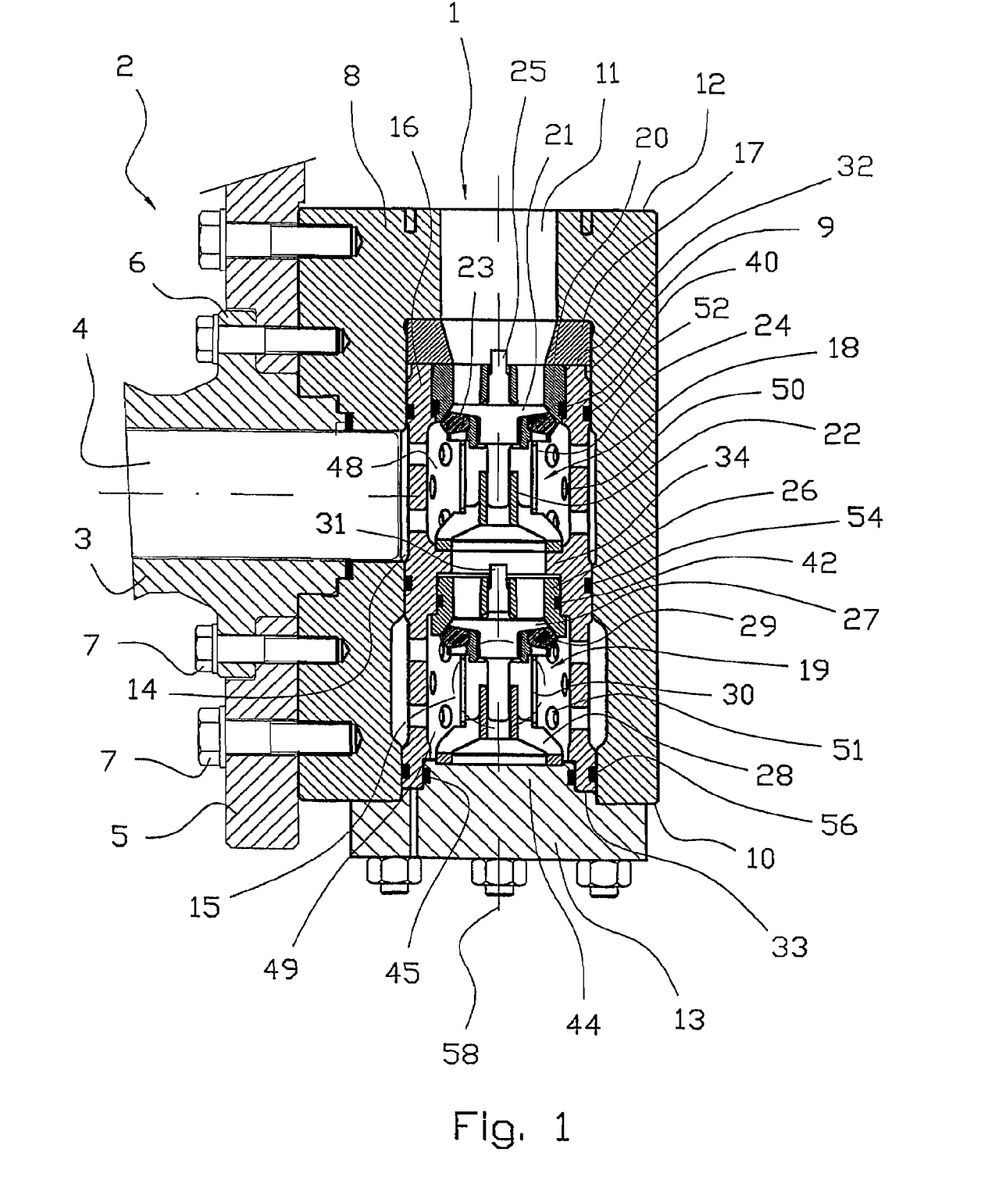
FIG. 1 shows a side section of part of a reciprocating engine with a valve arrangement mounted thereon.

In FIG. 1, reference number 1 denotes a valve arrangement mounted on a piston pump 2 and connected to the cylinder 3 of this, in which a reciprocating piston 4 is arranged in a known manner. An assembly plate 5 forms an extension of a flange 6 on the cylinder 3. The assembly plate 5 and the valve arrangement 1 are attached to the flange 6 and thereby to the cylinder 3 by the use of screws 7.

The valve arrangement 1 comprises a casing 8 in which a bore 9 that is open at one end 10 of the casing 8 ends within the casing 8 and joins an inlet 11 that is open at the other and opposite end of the casing 8. A cover 13 is designed to cover the bore 9 at the first end 10 of the casing 8.

A working passage 14 in the casing 8 forms an extension of the cylinder 3, to allow it to communicate with the bore 9. An outlet 15 leading from the bore and out of the casing 8 is shown in broken lines in FIG. 1. The inlet 11 and the outlet 15 are designed to be connected to piping systems (not shown) for incoming and outgoing fluid respectively.

In the bore 9 there is arranged a sleeve 16, the first end of which rests on a supporting ring 17, which in turn rests on the bottom of the bore 9. An in-valve 18 is installed in the sleeve 16, at the first end of this, and an out-valve 19 is installed at the second end of the sleeve 16. Both the in-valve 18 and the out-valve 19 are springloaded one-way valves, and the valves are mounted so as to open at a predetermined pressure differential acting in the direction from the first end of the sleeve 16 to the second end of the sleeve 16.

Figure 2:
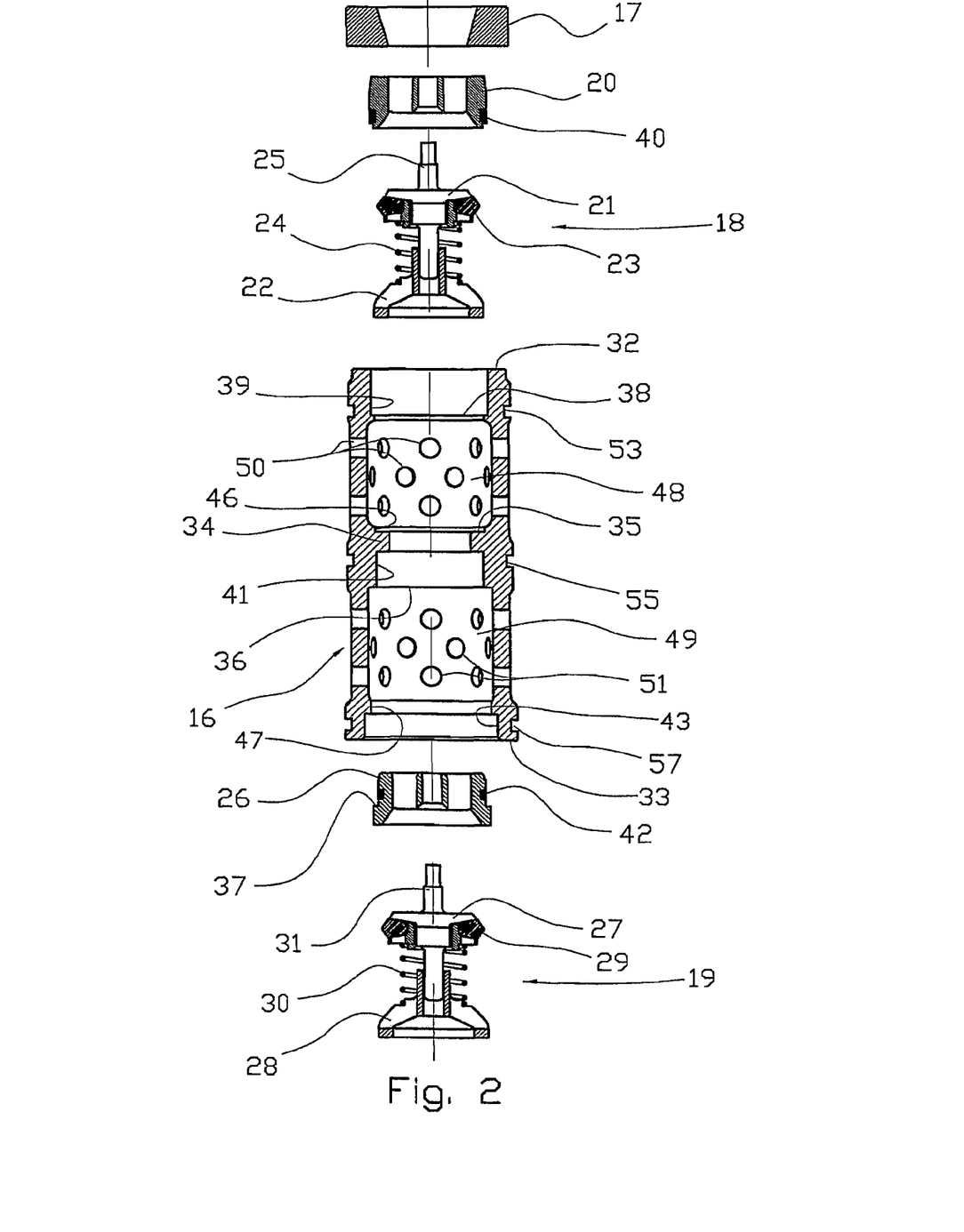
FIG. 2 shows a side section of a sleeve in the valve arrangement, as well as a side section of a supporting ring, an in-valve with a valve seat and an out-valve with a valve seat.
Figure 3:
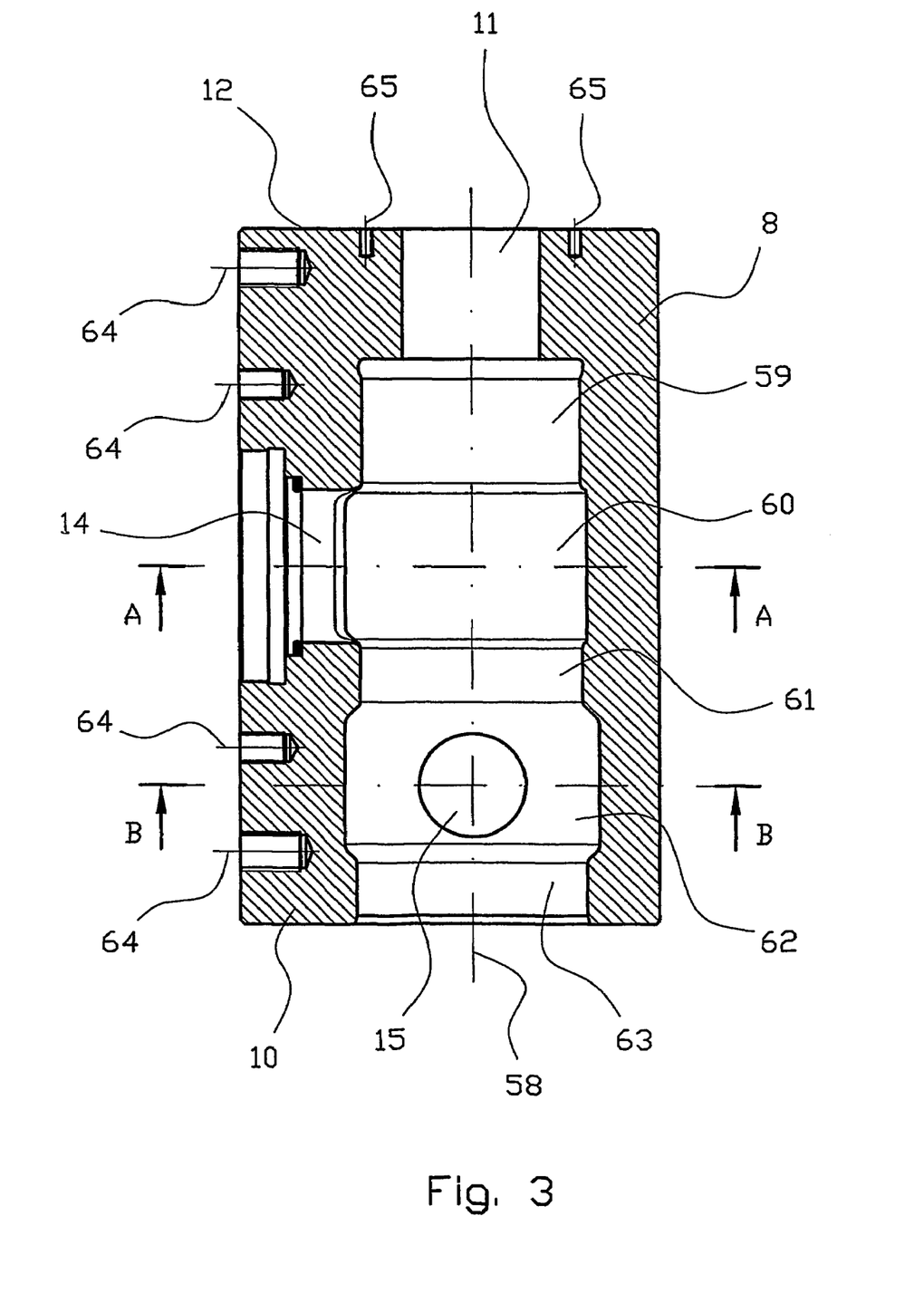
FIG. 3 shows a side section of the valve arrangement casing.

Reference is made to FIG. 2, which shows the components of the casing 8, the sleeve 16, the supporting ring 17, the in-valve 18 and the out-valve 19 laid out and ready for assembly. Reference is also made to FIG. 3, which shows the casing 8.

The sleeve 16 is generally tubular with a circular cross section and a number of internal shoulders for parts that form part of the in-valve 18 and the out-valve 19, which are both known.

The in-valve 18 comprises a valve seat 20, a valve body 21 designed to move in a valve guide 22. The valve body 21 is equipped with a sealing element 23. A valve spring 24 acting between the valve body 21 and the valve guide 22 is designed to force the valve body 21 with the sealing element 23 against the valve seat 20. The valve seat 20 is designed to receive a centric pin 25 on the valve body 21 in a known manner, thus contributing to the guiding of the valve body 21.

The out-valve 19 similarly comprises a valve seat 26 and a valve body 27 designed to move in a valve guide 28. The valve body 27 is equipped with a sealing element 29. A valve spring 30 acting between the valve body 27 and the valve guide 28 is designed to force the valve body 27 with the sealing element 29 against the valve seat 26. The valve seat 26 is designed to receive a centric pin 31 on the valve body 27 in a known manner, thus contributing to the guiding of the valve body 27.

Approximately half way between the first end 32 and the second end 33 the sleeve 16 is provided with an internal shoulder 34, where a first annular abutment surface 35 on one side of the shoulder 34 faces the first end 32 of the sleeve 16, and a second abutment surface 36 on the opposite side of the shoulder 34 faces the second end 33 of the sleeve 16.

The first abutment surface 35 is designed to support the valve guide 22 of the in-valve 18. The second abutment surface 36 is designed to support the valve seat 26 of the out-valve 19, which seat is designed with an external collar 37 arranged to rest against the second abutment surface 36.

A third annular abutment surface 38 in the sleeve 16 is designed to support the valve seat 20 of the in-valve 18. The third abutment surface 38 faces the same direction as the first abutment surface 35, and is located between the first abutment surface 35 and the first end 32 of the sleeve 16.

Between the first end 32 of the sleeve 16 and the third is abutment surface 38 the sleeve 16 is formed with a cylindrical portion designed to receive the valve seat 20 of the in-valve 18, and where the wall constitutes the sealing surface for a first annular gasket 40 disposed in a groove in the outer periphery of the valve seat 20.

By the third abutment surface 38 between the second end 33 of the sleeve 16 and the shoulder 34 there is a second internal cylindrical portion 41 designed to receive the valve seat 26 of the out-valve 19, and where the wall constitutes the sealing surface for a second annular gasket 42 disposed in a groove in the outer periphery of the valve seat 26.

Figure 6:
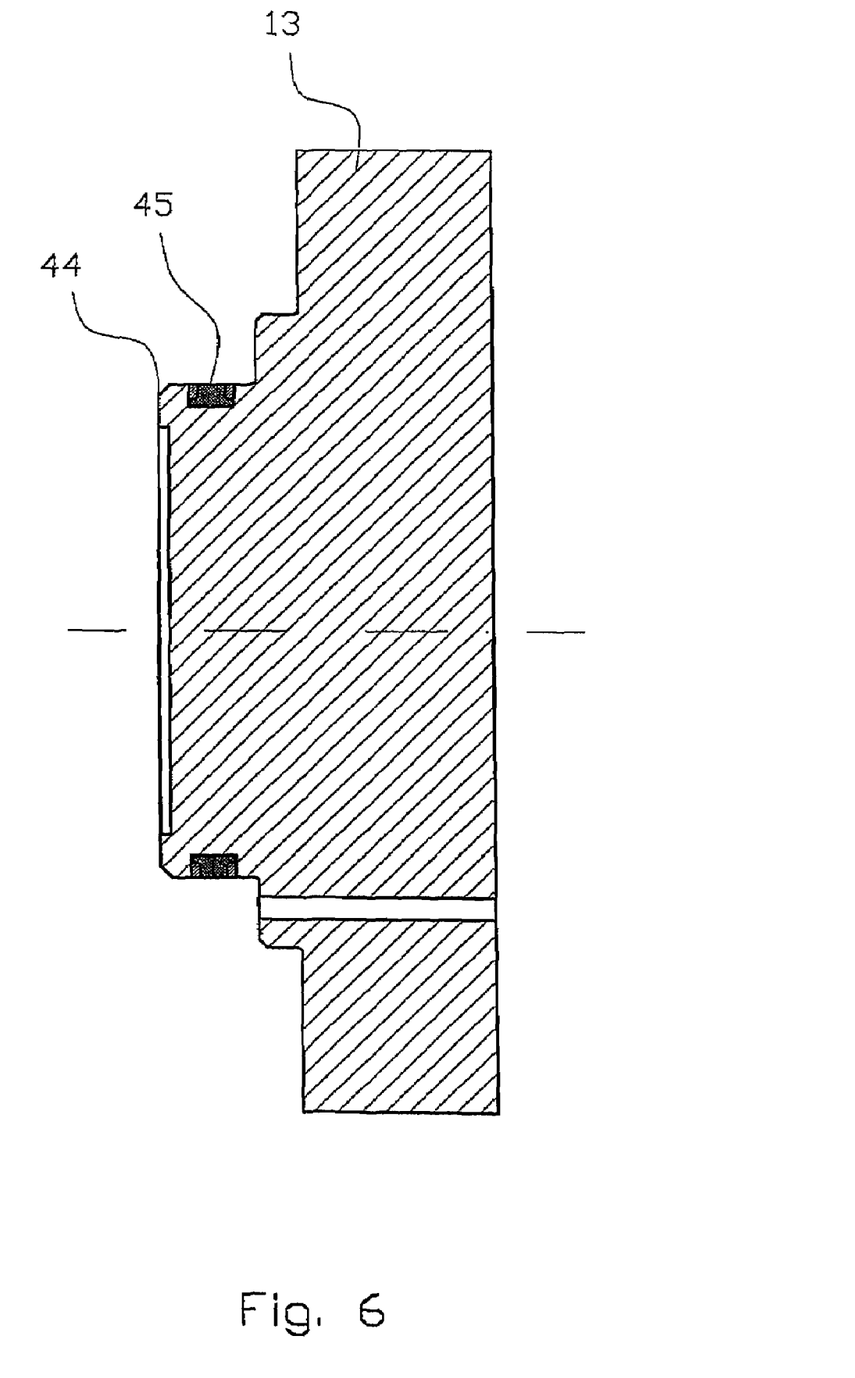
FIG. 6 is a side view of a cover for the casing.

A third internal cylindrical portion 43 is arranged at the second end 33 of the sleeve 16, which portion 43 is designed to receive a cylindrical stub 44 projecting from the cover 13, and where the wall constitutes the sealing surface for an annular third gasket 45 fitted in a groove on the stub 44. The cover 13 with the gasket 45 is shown in FIG. 6.

A fourth internal cylindrical portion 46 by the first abutment surface 35 is designed to centre the valve guide 22 of the in-valve 18.

A fifth internal cylindrical portion 47 next to the third cylindrical portion 43 for the cover 13 is designed to centre the valve guide 28 of the out-valve 19.

Figure 2A:
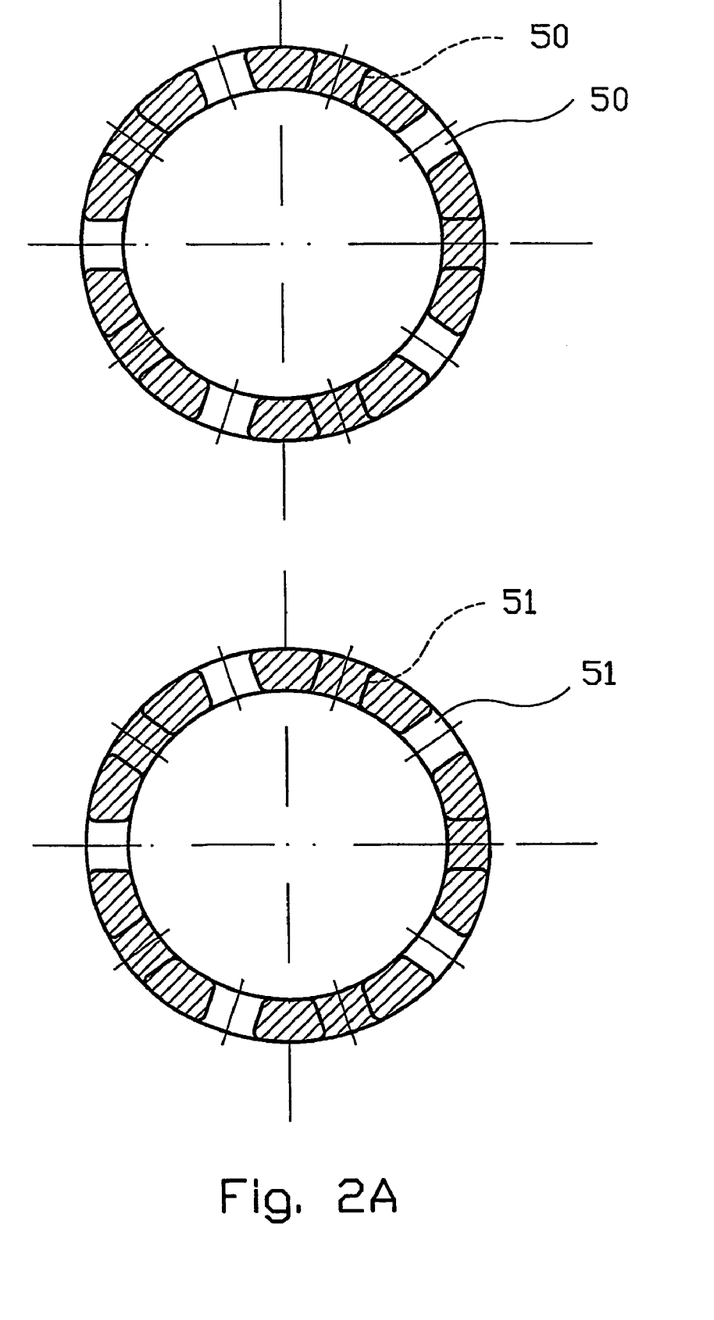
FIG. 2A shows two cross sections of the sleeve in FIG. 2.

The area between the first and third abutment surfaces 35, 38 of the sleeve 16 forms a first sleeve chamber 48 where the wall of the sleeve 16 is perforated with a first set of holes 50. The area between the second and third cylindrical portions 41, 43 of the sleeve 16 forms a second sleeve chamber 49 where the wall of the sleeve 16 is perforated with a second set of holes 51. FIG. 2A shows a section through the perforated wall of the sleeve 16 at the first and second sleeve chambers 48, 49.

Reference is made to FIG. 1 and FIG. 2. A fourth annular gasket 52 is disposed in an external groove 53 on the sleeve 16, by its first end. A fifth annular gasket 54 is disposed in an external groove 55 on the sleeve 16 in an area between the first set of holes 50 and the second set of holes 51. A sixth annular gasket 56 is disposed in an external groove 57 on the sleeve 16, in the area at the second end of this.

FIG. 3 shows a section through the casing 8 with the bore 9 with axis 58. The bore 9 consists of areas having different cross sections. At the bottom, the bore 9 is provided with a first cylindrical bore section 59 positioned centrically with respect to the axis 58, and the wall of the bore 9 forms a sealing surface for the gasket 52 at the first end of the sleeve 16, see FIG. 2.

A second cylindrical bore section 60 is positioned eccentrically with respect to the axis 58 and in a way that the bore section 60 is displaced towards the working passage 14, which ends in the bore section 60.

A third cylindrical bore section 61 is positioned centrically with respect to the axis 58, and the wall of the bore 9 forms the sealing surface for the gasket 54 of the sleeve 16, see is FIG. 2.

A fourth cylindrical bore section 62 is positioned eccentrically with respect to the axis 58 and in a way such that the bore section 62 is displaced towards the outlet 15, which ends in the bore section 62.

A fifth cylindrical bore section 63 at the free end of the bore 9 is positioned centrically with respect to the axis 58, and the wall of the bore forms the sealing surface for the gasket 56 of the sleeve 16, see FIG. 2.

Figure 4:
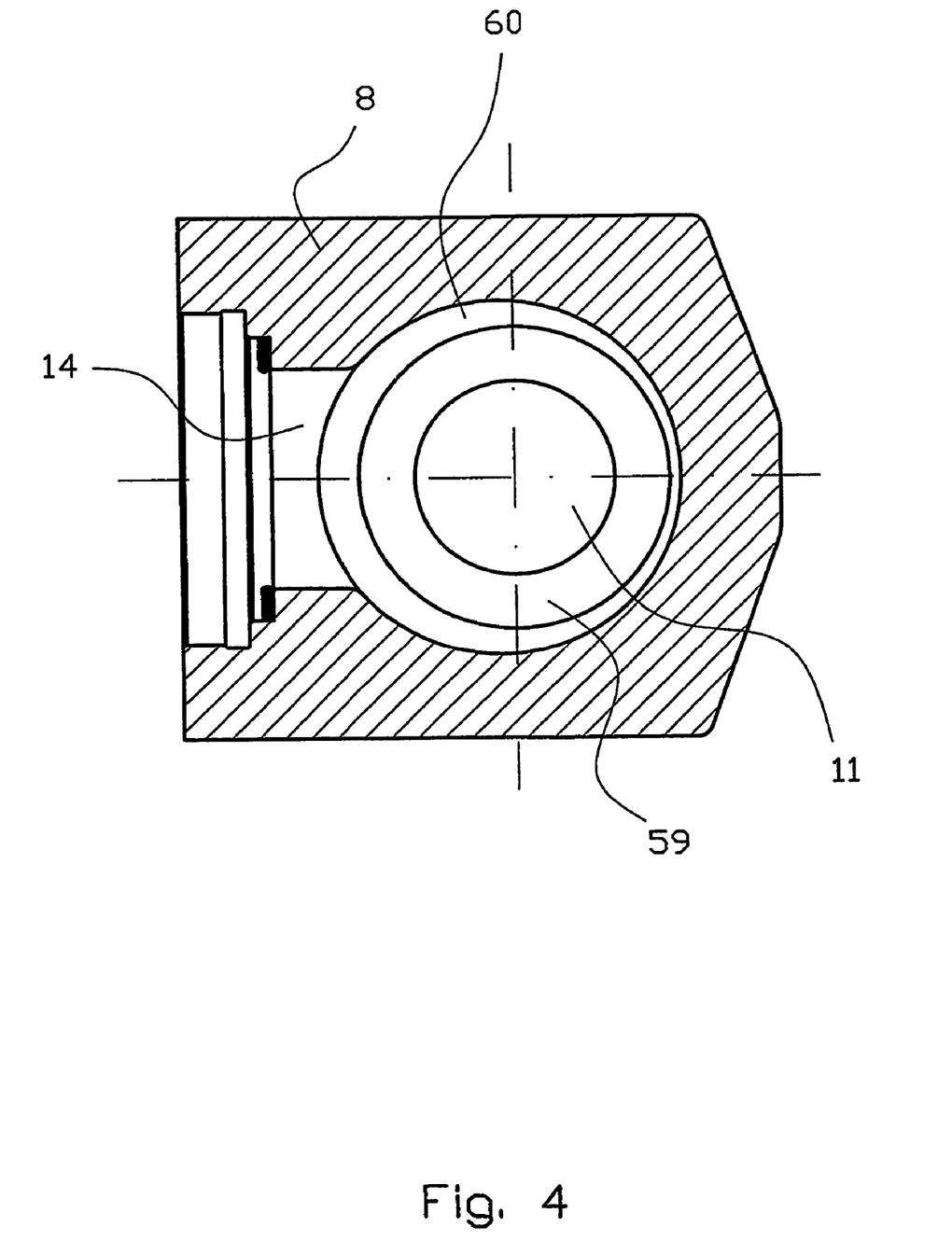
FIG. 4 shows a cross section of the casing in FIG. 3.
Figure 5:
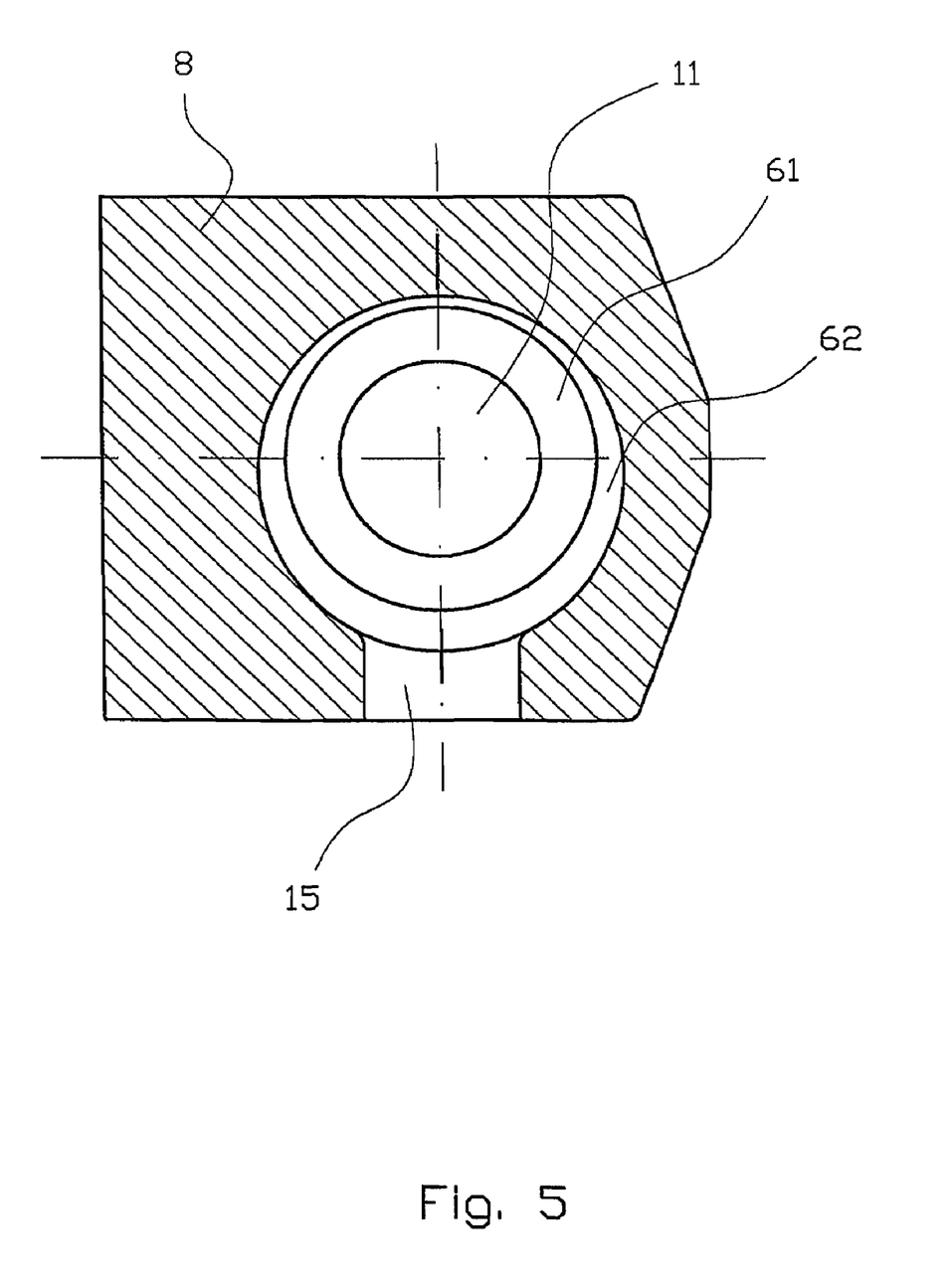
FIG. 5 shows another cross section of the casing in FIG. 3.

FIG. 4 shows a cross section of the casing 8 in a plane 25 marked with the letter A in FIG. 3, and FIG. 5 shows a cross section in a plane marked with the letter B in FIG. 3.

The casing 8 is provided with threaded holes 64 for fixing the casing 8 to the cylinder 3 and to the assembly plate 5 with the screws 7. Furthermore, the casing 8 is provided with threaded holes 65 for connecting an inlet pipe (not shown) to the casing 8, so as to allow said inlet pipe to communicate with the inlet 11. Similarly, the casing 8 is provided with threaded holes (not shown) for connecting an outlet pipe (not shown) to the casing 8, to allow said outlet pipe to communicate with the outlet 15. At the free end of the bore 9 the casing 8 is provided with threaded holes 65 for fixing the cover 13 with screws 66.

In order to simplify the installation of the sleeve 16 in the bore 9 and to help avoid damage to the gaskets and sealing surfaces, the first cylindrical section 59 of the bore 9 should have a smaller diameter than the third cylindrical section 61 of the bore 9, which in turn should have a smaller diameter than the fifth cylindrical section 63 of the bore 9.

The supporting ring 17 and the sleeve 16 with the valves 18, 19 are fitted in the bore 9 as shown in FIG. 1, and the cover 13 is fitted on the casing 8, covering the free end of the bore 9. The stub 44 on the cover 13 projects into the bore 9 and into the sleeve 16, abutting the valve guide 28 of the out-valve 19 and the second end 33 of the sleeve 16. Thus the cover 13 forces the sleeve 16 against the supporting ring 17, which rests against the bottom of the bore 9. The valve seat 20 of the in-valve 18 is thereby forced against the in-valve body 21, so as to tension the spring 24. At the same time, the cover 13 forces the valve guide 28 of the out-valve 19 into the sleeve 16, so that the valve spring 30 is tensioned against the valve body 27.

When the sleeve 16 with the in-valve 18 and the out-valve 19 is installed in the bore 9 in the casing 8, as shown in FIG. 1, the eccentrically positioned bore sections 60, 62 form eccentric annuli outside the sleeve 16. The largest cross section of the annuli is on the side facing the working passage 14 and the outlet 15 respectively, and the smallest cross section is at the diametrically opposite side of said passages.

When the piston pump 2 is operating, fluid at the inlet is transported via the valve arrangement 1 and the cylinder 3 to the outlet 15, where the fluid is delivered at a higher pressure that of the inlet 11. The induction stroke of the piston 4 reduces the pressure in the cylinder 3 and thereby also the pressure in the first sleeve chamber 48, to allow the pressure differential across the valve body 21 of the in-valve 18 to overcome the force from the valve spring 24 and push the valve body 21 away from the valve seat 20. The out-valve 19 is closed. Fluid flows from the inlet 11 past the valve seat 20, into the first sleeve chamber 48 and then radially out of the sleeve chamber 48 via the holes 51 to the cylinder 3.

When the piston 4 then executes a power stroke, the in-valve 18 closes and the fluid pressure in the cylinder 3 increases until the pressure differential across the valve body 27 of the out-valve 19 overcomes the force from the valve spring 30, pushing the valve body 27 away from the valve seat 26 and opening the out-valve 19. Fluid flows from the cylinder 3 via the holes 50, radially into the first sleeve chamber 48, past the valve seat 26 of the out-valve 19 to the second sleeve chamber 49, and radially out of this via the holes 51 to the outlet 15.

Upon reciprocating movement of the piston 4 the casing 8 and the sleeve 16 are subjected to varying pressure and thereby to a varying load.

Thus it can be mentioned that upon the power stroke of the piston 4 the sleeve 16 is subjected to a first axial force against a first annular area defined by the diameter of the sealing surfaces of the first gasket 40 and the fourth gasket 52, and a second, opposite directed axial force against a second annular area defined by the diameter of the sealing surfaces of the third gasket 45 and the sixth gasket 56. The sleeve 16 is thereby subjected to an axial tensile force between said annular areas. The dimensions should be selected so as to make the net force, i.e. the difference between the numerical values of the first and second axial forces, push the first end 32 of the sleeve 16 against the supporting ring 17. The area at the first end 32 of the sleeve 16 is then subjected to a compressive force corresponding to said net force.

Upon the induction stroke of the piston 4 only the area between the second gasket 42 and the third/sixth gasket 45, 46 is exposed to the operating pressure of the pump 2. As the force against the valve body 27 of the out-valve 19 is taken up by the sleeve 16, the area between the second gasket 42 and the third gasket 45 is exposed to tension. The area between the second gasket 42 and the first end 32 of the sleeve 16 is subjected to a compressive force determined by the operating pressure and the diameter of the bore 9 at the sealing surface of the second gasket 42.

The area between the second and third gaskets 42, 45 is thereby subjected to a varying tensile force. The area between the first and second gaskets 40, 42 alternates between tensile and compressive force. The area between the first gasket 40 and the first end 32 of the sleeve 16 is subjected to a varying compressive force. A person skilled in the art will, based on this, be able to dimension the casing 8, the supporting ring 8 and the sleeve 16 so as to resist the varying loads.

The invention claimed is:

1. A valve arrangement for a reciprocating machine, the arrangement comprising: an in-valve and an out-valve, each valve being a springloaded one-way valve designed to open for flow when the pressure differential in the direction of flow provides a force that exceeds the spring tension, wherein the valves are mounted in a casing that forms or is connected to a cylinder head of the reciprocating machine, wherein the in-valve and the out-valve are mounted in one common sleeve designed to be fitted in a bore in the casing, and where fluid may flow to the sleeve from an inlet in the casing and into the sleeve is provided with at least one perforated area where fluid may flow radially out of or into the sleeve via holes, thereby flowing to or from a passage that forms a perpendicular or near perpendicular connection with the bore, wherein the bore is provided with at least one eccentrically positioned cylindrical section with a larger diameter than that of adjacent sections of the sleeve, and where the eccentrically positioned section communicates with said passage.

2. A valve arrangement for a reciprocating machine, the arrangement comprising:
   an elongated casing that extends in an axial direction along an imaginary axis, the casing having a cross-section that extends in both transverse and lateral directions, the transverse direction being perpendicular to the axial direction, and the lateral direction being perpendicular to the axial direction and perpendicular to the transverse direction;
   the casing having
      an inlet receiving fluid flowing in the axial direction;
      an outlet discharging fluid in the lateral direction;
      an opening for receiving and discharging fluid in the transverse direction to and from the reciprocating machine;
      an axially elongated inlet passage in fluid communication with the inlet and having a cross-section along the lateral and transverse directions that is concentric with respect to the axis;
      an axially elongated outlet passage in fluid communication with the outlet and having a cross-section along the lateral and transverse directions that is eccentric with respect to the axis, wherein the largest area of the outlet passage cross section is oriented towards the outlet in the lateral direction; and
      an axially elongated working passage sandwiched between and in fluid connection with the inlet and outlet passages, the working passage having a cross-section along the lateral and transverse directions that is eccentric with respect to the axis, wherein the largest area of the working passage cross section is oriented towards the opening in the transverse direction; and
   an elongated one-piece sleeve fitted in the casing, the one-piece sleeve housing
      a spring-loaded one-way in-valve that is aligned at one end of the sleeve and that biases to close the inlet passage, the in-valve designed to open and allow flow of fluid into the sleeve via the inlet when the fluid pressure differential towards the in-valve in the axial direction exceeds the force of the spring, and
      a spring-loaded one-way out-valve that is aligned at the other end of the sleeve and that biases to close the outlet, the out-valve designed to open and allow flow of fluid out of the sleeve via the outlet when the differential fluid pressure towards the out-valve in the axial direction exceeds the force of the spring;
   the sleeve comprising a first perforated area allowing fluid flow from the inlet passage to the opening and a second perforated area allowing fluid flow from the opening to the outlet.

* * * * *